US012614686B2

(12) United States Patent
Young

(10) Patent No.: US 12,614,686 B2
(45) Date of Patent: Apr. 28, 2026

(54) ARC-FREE HYBRID RELAY

(71) Applicant: Enphase Energy, Inc., Petaluma, CA (US)

(72) Inventor: Chris Morrow Young, Round Rock, TX (US)

(73) Assignee: Enphase Energy, Inc., Petaluma, CA (US)

( * ) Notice: Subject to any disclaimer, the term of this patent is extended or adjusted under 35 U.S.C. 154(b) by 241 days.

(21) Appl. No.: 18/387,087

(22) Filed: Nov. 6, 2023

(65) Prior Publication Data

US 2024/0161989 A1 May 16, 2024

Related U.S. Application Data

(60) Provisional application No. 63/424,638, filed on Nov. 11, 2022.

(51) Int. Cl.
*H01H 47/02* (2006.01)
*H01H 50/16* (2006.01)
*H01H 89/00* (2006.01)

(52) U.S. Cl.
CPC ............ *H01H 47/02* (2013.01); *H01H 50/16* (2013.01); *H01H 89/00* (2013.01)

(58) Field of Classification Search
None
See application file for complete search history.

(56) References Cited

U.S. PATENT DOCUMENTS 4,772,809 A 9/1988 Koga et al.
7,110,225 B1 * 9/2006 Hick ...................... H01H 9/542 361/8
2005/0195550 A1 * 9/2005 Fitzgerald .............. H01H 9/542 361/139
2009/0097172 A1 4/2009 Bremicker et al.
2020/0185904 A1 6/2020 Askan
2020/0365345 A1 11/2020 Telefus et al.
2020/0366079 A1 * 11/2020 Telefus ............. H02J 13/00022
2022/0239115 A1 7/2022 Zohar et al.

FOREIGN PATENT DOCUMENTS

CN 201726330 U 1/2011
CN 202586792 U 12/2012
CN 109660233 A 4/2019
CN 111261460 A 6/2020
CN 211628989 U 10/2020
GB 2497648 A 6/2013
JP 2017191682 A 10/2017

OTHER PUBLICATIONS

International Search Report for PCT/US2023/036845, dated Mar. 7, 2024.

* cited by examiner

*Primary Examiner* — Bernard Rojas
(74) *Attorney, Agent, or Firm* — Moser Taboada

(57) ABSTRACT

Apparatus forming an arc-free hybrid relay having an air gap when in the off state. The apparatus comprises a first relay coupled to a second relay, and having a semiconductor switch arranged to temporarily shunt current around the second relay.

9 Claims, 3 Drawing Sheets

ARC-FREE HYBRID RELAY

RELATED APPLICATION

This application claims benefit to U.S. Provisional Patent Application Ser. No. 63/424,638 filed 11 Nov. 2022 entitled "Arc-Free Hybrid Relay," which is hereby incorporated herein by reference in its entirety.

BACKGROUND

Field

Embodiments of the present invention generally relate to hybrid relays and, in particular, to an arc-free hybrid relays.

Description of the Related Art

Energy management systems utilize relays to control connectivity of sources (e.g., solar or wind generation systems) to loads (e.g., lighting, air conditioners, electric vehicles, energy storage systems, etc.). A relay comprises contacts that are electro-mechanically opened and closed. When the contacts are open, an air gap is formed and current does not flow through the relay, i.e., the off state.

For a relay used in energy management systems to comply with government regulations, the relay must create an air gap in the current path when the relay is in the off state, i.e., when not conducting current. When relays switch off and on while current is flowing through the relay, an arc is generated across the relay contacts as the contacts are opened or closed. Repeated operation of the relay rapidly erodes the contacts and causes the relay to fail.

A solution to the arcing problem is to use a hybrid relay. A hybrid relay comprises a semiconductor switch (e.g., MOSFET or TRIAC) that is coupled across the contacts of the relay. The semiconductor switch is activated (i.e., conducts) just before the relay contacts are opened or closed and continues to conduct until the contacts are fully open or fully closed. Typically, the semiconductor switch is active for 5 to 15 mS. During this short period of time when the switch is active, the voltage across the contacts is nearly zero (i.e., small enough that an arc cannot form) because the relay current is flowing through the semiconductor switch. The switch, while conducting, may form a small voltage drop (i.e., nearly zero voltage) that will appear across the relay contacts, but the voltage is too small to create an arc. With nearly zero voltage across the contacts, no arc is formed as the contacts open or close. Consequently, the hybrid relay has a much longer life than a standard relay. However, the hybrid relay positions the semiconductor switch across the relay contact which does not comply with government regulations for energy management systems, i.e., there is no air gap formed by the relay in the current flow path because the semiconductor switch forms a bridge across the contact air gap.

Therefore, there is a need for an arc-free hybrid relay that does form an air gap in the current path when the relay is in the off state.

SUMMARY

An arc-free hybrid relay having an air gap when in the off state is provided substantially as shown in and/or described in connection with at least one of the figures, as set forth more completely in the claims.

Various features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the various features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise an arc-free hybrid relay having an air gap when in the off state.

Figure 1:
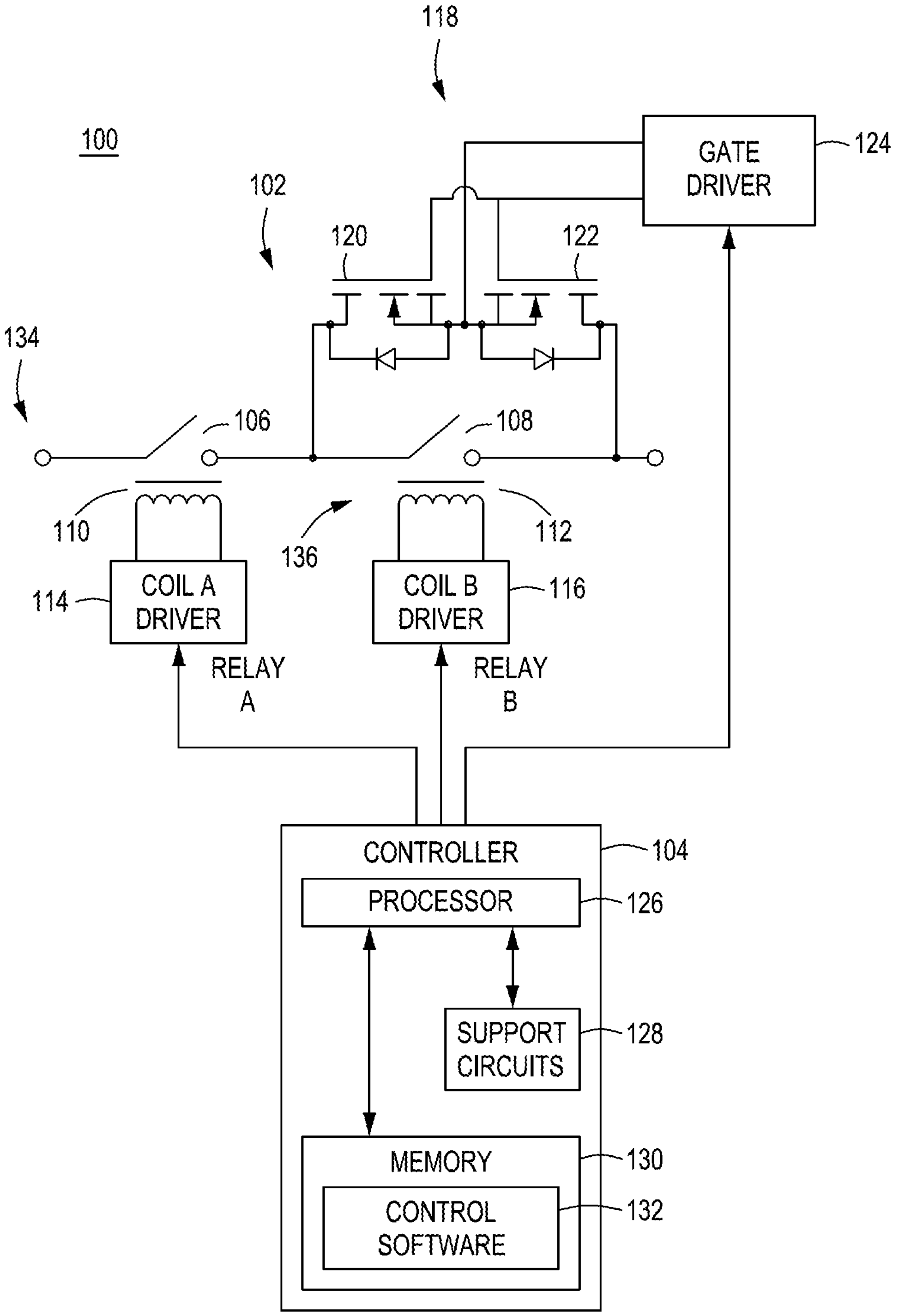
FIG. 1 depicts a schematic block diagram of a hybrid relay and its control circuitry in accordance with at least one embodiment of the invention.

FIG. 1 depicts a schematic block diagram of an arc-free hybrid relay architecture 100 in accordance with at least one embodiment of the invention. The architecture 100 comprises a hybrid relay 102 coupled to a controller 104. The controller 104 controls the hybrid relay 102 in accordance with the methods shown and described in FIGS. 3 and 4 below. The hybrid relay 102 comprises a first relay (relay A) 134, a second relay (relay B) 136 and a semiconductor switch 118. The first relay 134 and the second relay 136 are connected in series, and the semiconductor switch 118 is connected in parallel across the second relay 136, i.e., the semiconductor switch 118 selectively shunts current around the second relay 136. The semiconductor switch 118, when conducting, has a voltage drop that is less than the arcing voltage of the relay contacts.

The first relay 134 (relay A) comprises moveable contacts 106 that form an air gap in the off state, an electromagnetic coil 110 and a driver 114 for the coil 110. Similarly, the second relay 136 (relay B) comprises moveable contacts 108 that form an air gap in the off state, an electromagnetic coil 112 and a driver 116 for the coil 110. In one embodiment, the semiconductor switch 118 comprises series connected MOSFETs 120 and 122. In another embodiment, the semiconductor switch may be a TRIAC or other high power semiconductor switch that has a voltage drop that is less than the arcing voltage of the relay contacts 108. The gates and drains of the MOSFETs 120 and 122 are coupled to a gate driver 124. The coil drivers 114 and 116 and the gate driver 124 are coupled to, and controlled by, the controller 104. The drivers 114, 116, and 124 are conventional and well-known solid-state circuits for respectively applying energy to the coils to move the contacts and biasing the MOSFETs to conduct or not conduct.

The controller 104 comprises at least one processor 126, support circuits 128 and memory 130. The at least one processor 126 may be any form of processor or combination of processors including, but not limited to, central processing units, microprocessors, microcontrollers, field programmable gate arrays, graphics processing units, state machine, and the like capable of executing software instructions to cause the controller 104 to perform the functions described herein. The support circuits 128 may comprise well-known circuits and devices facilitating functionality of the processor(s). The support circuits 128 may comprise one or more of, or a combination of, power supplies, clock circuits, communications circuits, cache, displays, and/or the like.

The memory 130 comprises one or more forms of non-transitory computer readable media including one or more of, or any combination of, read-only memory or random-access memory. The memory 130 stores software including, for example, control software 132. The control software 132 may comprise software instructions that, when executed by the at least one processor 126, cause the controller to operate the hybrid relay 102 in an arc-free manner. Details of the operation of the control software 132 to enable the hybrid relay to operate in an arc-free manner is described with respect to FIGS. 3 and 4 below.

Figure 2:
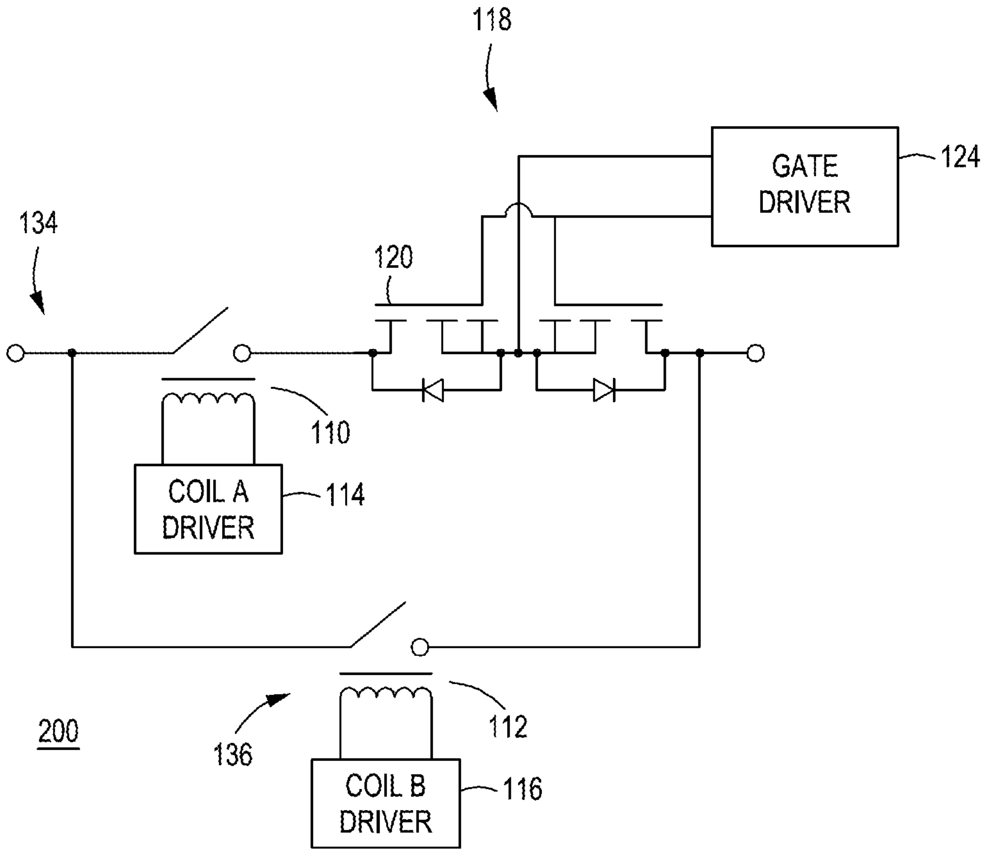
FIG. 2 depicts a schematic block diagram of a hybrid relay in accordance with at least one alternative embodiment of the invention.

FIG. 2 depicts a schematic block diagram of a hybrid relay 200 in accordance with at least one alternative embodiment of the invention. The hybrid relay 200 comprises a first relay (relay A) 134, a second relay (relay B) 136 and a semiconductor switch 118. In this embodiment, the first relay 134 and semiconductor switch 118 are connected in series, and the second relay 136 is connected in parallel across the first relay 136 and semiconductor switch 118, i.e., the semiconductor switch 118 and first relay 136, in series combination, selectively shunt current around the second relay 136. The controller (not shown in FIG. 2) controls the hybrid relay 200 as described with respect to FIGS. 3 and 4.

Figure 3:
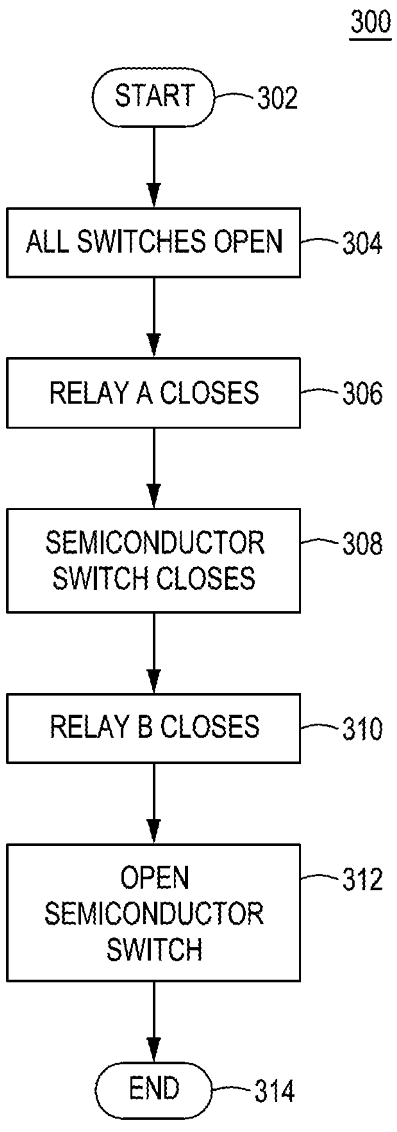
FIGS. 3 and 4 depict flow diagrams of operation of the hybrid relay of FIGS. 1 and 2 in accordance with at least one embodiment of the invention.

FIG. 3 depicts a flow diagram of a method 300 of operation of the control software 132 when executed by the processor(s) of a controller 104 in accordance with at least one embodiment of the invention. Each block of the flow diagrams below may represent a module of code to execute and/or combinations of hardware and/or software configured to perform one or more processes described herein. Though illustrated in a particular order, the following figure is not meant to be so limiting. Any number of blocks may proceed in any order (including being omitted) and/or substantially simultaneously (i.e., within technical tolerances of processors, etc.) to perform the operations described herein.

FIG. 3 depicts the method 300 for operating the hybrid relays of FIGS. 1 and 2 to switch from an off state (no current flow) to an on state (conducting current). The method 300 begins at 302 and proceeds to 304 where the method 300 opens all the switches (i.e., the relays A and B are physically opened to form air gaps between the contacts and the semiconductor switch is deactivated). While all the switches are open, no current flows and an air gap is created in relays A and B and only one of the air gaps is shunted by the switch such that the hybrid relay is compliant with government regulations for energy management systems. At 306, relay A is closed. Since the semiconductor switch is deactivated and relay B is open, no current flows and no arc can be created at the contacts of relay A as the contacts are closing.

At 308, the semiconductor switch is temporarily closed (i.e., activated) to enable current to flow through relay A and the semiconductor switch. At 310, the method 300 closes relay B and relay B will carry current through the hybrid relay. However, because relay A and the semiconductor switch were already conducting, the voltage across relay B is nearly zero (i.e., small enough that an arc cannot occur) and no arc will occur as the contacts of relay B are closed.

At 312, the method 300 deactivates (opens) the semiconductor switch such that all the current through the hybrid relay flows through relay B. Current flows through the semiconductor switch only for a short period of time, i.e., the period of time required for the relay B contacts to close. Typically, the time required for current to temporarily flow through the semiconductor switch is between 5 and 15 mS. The method ends at 314.

For the hybrid relay of FIG. 2, at the end of method 300, relay A may be left closed or may be opened. Since relay A is not in the current path during the on state, the relay A contact position is not relevant to the operation of the hybrid relay. However, since most relays are normally open when not powered, relay A contacts will, in most instances, be open at the end of method 300.

Figure 4:
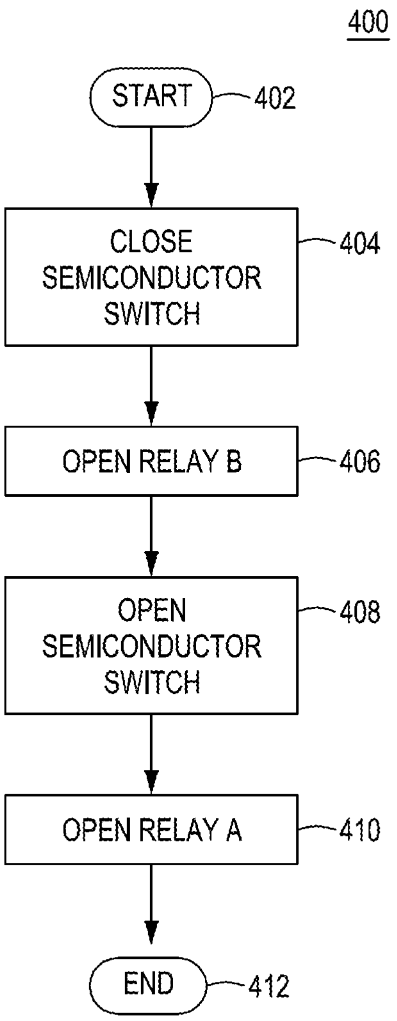

FIG. 4 depicts a flow diagram of a method 400 of operation of the control software 132 when executed by the processor(s) of a controller 104 in accordance with at least one embodiment of the invention. Each block of the flow diagrams below may represent a module of code to execute and/or combinations of hardware and/or software configured to perform one or more processes described herein. Though illustrated in a particular order, the following figure is not meant to be so limiting. Any number of blocks may proceed in any order (including being omitted) and/or substantially simultaneously (i.e., within technical tolerances of processors, etc.) to perform the operations described herein.

FIG. 4 depicts the method 400 for operating the hybrid relays of FIGS. 1 and 2 to switch from an on state to an off state having an air gap in the conduction path. It is assumed that the method 400 begins where method 300 ended—relays A and B are closed and the semiconductor switch is deactivated. If relay A is open in FIG. 2, the method 400 must close relay A before performing step 404. The method 400 begins at 402 and proceeds to 404, where the method 400 temporarily closes the semiconductor switch. At 306, relay B is opened. Since the semiconductor switch is activated, the voltage across relay B is nearly zero and no arc can be created at the contacts of relay B as it opens.

At 408, the method 400 opens the semiconductor switch and, at 410, opens the contacts of relay A. Since the semiconductor switch is deactivated, no current is flowing through relay A and no arc is created. The method 400 ends at 412.

When complete, all switching to place the hybrid relay into the off state has occurred without arcing and an unshunted air gap is formed in the conducting path by relays A and B. Relay A's air gap is not shunted with the semiconductor switch, thus creating a compliant hybrid relay. As such, the hybrid relay complies with government regulations for relays that may be used in energy management systems.

As noted above, switching of a relay requires 5-15 mS. As such, the amount of time the semiconductor switch is required to conduct current to facilitate the voltage across relay B to fall to near zero (i.e., to a level that cannot form an arc) is very short. Thus, the MOSFETs do not require very large power dissipation ratings. In an energy management system, the MOSFETs must be capable of conducting 100A of current during their activation time. Consequently, SiC MOSFETs are good candidates for an energy management application.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus comprising:

a first relay having first contacts;

a second relay having second contacts and being serially coupled to the first relay; and a semiconductor switch coupled in parallel across the second contacts of the second relay, and the first relay does not have the semiconductor switch shunting the first contacts of the first relay, wherein the semiconductor switch, when conducting, has a voltage drop that is less than an arcing voltage of the second relay contact.

2. The apparatus of claim 1 further comprising a controller for controlling the first relay, the second relay and the semiconductor switch to enable opening or closing the first and second contacts without creating an arc.

3. The apparatus of claim 2 wherein, to allow current flow, the controller closes the first contacts of the first relay, closes the semiconductor switch, closes the second contacts of the second relay and opens the semiconductor switch.

4. The apparatus of claim 2 wherein, to impede current flow, the controller closes the semiconductor switch, opens the second contacts of the second relay, opens the semiconductor switch and opens the first contacts of the first relay.

5. The apparatus of claim 2 wherein the controller activates the semiconductor switch to shunt current around the second relay for a period commensurate with a time required for the second contacts of the second relay to open or close.

6. The apparatus of claim 1 wherein the semiconductor switch comprises a first MOSFET and second MOSFET connected in series.

7. The apparatus of claim 6, further comprising a first coil driver connected to the first relay, a second coil driver connected to the second relay, and a gate driver connected to gates and drains of the first MOSFET and second MOSFET.

8. The apparatus of claim 7, further comprising a controller for controlling the first coil driver, the second coil driver, and the gate driver to enable opening or closing the first and second contacts without creating an arc.

9. The apparatus of claim 1, wherein the semiconductor switch is at least one of a SiC (Silicon Carbide) MOSFET or a Triode for Alternating Current (TRIAC).

* * * * *